METHOD OF, AND MEANS FOR, DUPLEX-MULTIPLEX COMMUNICATIONS

Filed Feb. 13, 1961

INVENTOR.

BY Paul Curry

METHOD OF, AND MEANS FOR, DUPLEX-MULTIPLEX COMMUNICATIONS

Filed Feb. 13, 1961

INVENTOR.
BY Paul Curry

METHOD OF, AND MEANS FOR, DUPLEX-MULTIPLEX COMMUNICATIONS

Filed Feb. 13, 1961 5 Sheets-Sheet 3

INVENTOR.

BY Paul Curry

May 11, 1965 P. CURRY 3,183,508

METHOD OF, AND MEANS FOR, DUPLEX-MULTIPLEX COMMUNICATIONS

Filed Feb. 13, 1961 5 Sheets-Sheet 4

INVENTOR.

BY Paul Curry

INVENTOR.
BY Paul Curry 3,183,508

METHOD OF, AND MEANS FOR, DUPLEX-MULTIPLEX COMMUNICATIONS

Paul Curry, 2669 Main St., Santa Monica, Calif.

Filed Feb. 13, 1961, Ser. No. 88,801
4 Claims. (Cl. 343—176)

The present application constitutes a continuation-in-part of my co-pending application Serial No. 669,223, filed July 1, 1957.

The present invention relates to a method of, and means for, the communication of intelligence, and more particularly to a receiving system in which a locally generated wave cooperates with a number of independent signals simultaneously transmitted within a frequency bandwidth of a single modulated signal, to receive any one of the signals, while substantially attenuating all the others, or to receive all of these simultaneously.

Since in one application of the invention, it is found that the system achieves high efficiency when the amplitude of the local wave is much greater than the amplitude of the received signals, it is proposed to modulate the local wave with an independent signal, to be transmitted simultaneously with the detection of the signals to be received. Such a method makes possible an electrical communication system capable of simultaneously transmitting and receiving intelligence over a single transmission system and within the bandwidth requirements conventionally allocated for a single-signal one-way transmission.

While it is preferred to carry out the various features of the invention by the method of amplitude modulation in which both equal sidebands and the carrier wave are emitted, it will be shown that the invention is also effective when low-deviation frequency modulation is employed.

Though the method to be herein described is capable of simultaneous transmission and reception of intelligence, it is not intended to thus limit its operation, for it may be used as an excellent receiving system in conjunction with conventional electrical communication techniques.

The receiving system comprises three principal steps in its operation which it may be desirable to set forth before describing the objects of this invention and the means by which they may be achieved.

The first step consists of separating from the total input signal to a receiver, the fundamental functions of frequency-difference which constitute interference with a desired signal. The second step comprises the reduction of the functions of interference in the total input signal, by the fundamental functions of frequency-difference separated from the total input signal. The third step consists of the detection of the desired signal, with the functions of frequency-difference which constitute interference substantially reduced.

The method of the receiving system may be further clarified by consideration of the following theoretical example.

It may be assumed that a local-wave generated at a receiving station is caused to maintain a quadrature phase relationship with an amplitude-modulated signal-wave of equal frequency appearing at its input, so that each of two equal and aiding-phase components of the signal-wave are in quadrature phase relationship with each of two equal and opposing-phase components of the local-wave. The resultant waves derived from the two equal combinations will therefore vary from opposing-phase relationship in accordance with the varying amplitude of the signal wave, but the amplitudes of both resultant waves will be equal, regardless of the amplitude variations of the signal wave.

It will be assumed that any slight variation in the phase of the signal with respect to its quadrature phase relationship with the local-wave will, by means hereinafter to be described, cause the local-wave to advance or retard its phase sufficiently to maintain the quadrature phase difference with the signal-wave.

While it is not intended to limit the invention to particular amplitude relationships between the local-wave and the signal-wave, it is preferred that the amplitude of the local-wave is large compared to the amplitude of the signal wave.

If the two resultants above discussed are separately detected, and the results are oppositely combined, the sum will show no amplitude variations and the signal variations, though present in each of the resultant waves, will be found to have disappeared in the sum.

Assume, now, that a second signal-wave, also amplitude-modulated but by a different signal, is added to the first signal-wave above described, the frequency of which is such that the frequency difference between the two signal-waves falls in the audio band, and the local-wave is caused to maintain a quadrature phase relationship with the first signal-wave.

Since the frequency of the local-wave is substantially that of the first signal-wave, the frequency difference of the second signal-wave with the first signal-wave equals its frequency difference with the local-wave; and the frequency-difference between both signal-waves appears as a fundamental function in the detected products of both resultants, but of opposite polarity on one, with respect to the other, so that the sum of the resultant waves, while having no amplitude variations representative of the first signal-wave will, however, have a fundamental function of the wave of frequency-difference between the first and second signal-waves. This constitutes the first step in the operation of the invention.

The fundamental function representing the wave of interference is now substantially amplified and caused to amplitude-modulate one component of the local-wave. The modulation, applied in opposite sign to the polarity of the fundamental function constitutes, in effect, the application of negative feedback to reduce the amplitude of the second signal, and consequently the fundamental function of amplitude variation on the local-wave which represents the frequency-difference between both signal-waves. This demonstrates the second step in the receiver operation of this invention.

The phase variations of the local-wave, after the application of negative feedback to reduce the amplitude of the second signal, are detected by well-known means of phase discrimination to produce a fundamental wave representative of the modulations on the first signal, together with a much reduced fundamental wave representing the second signal. This represents the third step in the receiver operation of the invention.

The receiving method of the present invention may be carried out by other alternate operations, one of which will here be described.

For example, a single component of a local-wave (instead of two oppositely phased components in the previous example) is caused to maintain a quadrature phase relationship with the composite wave of two signal waves above described, the local-wave being again of equal frequency with the first signal-wave, and again being phase varied by the wave of frequency difference between the second and first signal waves.

As before, the phase variations of the local-wave are detected and substantially amplified but, instead of applying the thus detected wave in the form of amplitude modulation of the local-wave as before, it is applied to vary the phase of the local-wave in an opposite direction to the original phase variations, thus, in effect, constituting the application of inverse feedback on the phase variations and substantially reducing their excursions.

As a result, the wave of frequency difference between the first and second signal waves will appear as amplitude variation of the local-wave. This is detected and substantially amplified, and the result is applied as inverse feedback on the wave of frequency difference by amplitude modulation of the local-wave.

By detecting the phase variations of the resultant of the local-wave plus the signal wave, the detected signal appears as a substantial representation of the first signal, substantially free from interference by the second signal.

Still another way in which the method of the present invention may be carried out consists of amplifying and limiting one component of the composite signal before described, and detecting the phase variations representing the wave of frequency difference between the first signal and the second signal. The amplitude modulations of a second component of the composite signal are also detected.

A local-wave of independent frequency is amplitude modulated by the products of phase modulation detected, as described, from the composite signal, while the products of amplitude modulation detected from the composite signal are applied as phase modulation of the local-wave.

This double-modulated second local-wave, with the degrees of both amplitude and phase modulation properly adjusted, is now demodulated and the amplitude variations representative of the wave of frequency difference between the first and second signal-waves are amplified and applied as inverse feedback on the original amplitude variations by amplitude modulation of the second wave. The first signal-wave which it is desired to receive is now free from interference by the second signal-wave, when detected from the phase variations of the second local-wave.

In the above examples, only two signal-waves are provided, one of which is the desired signal, and the other is the interference signal it is desired to reject. It will be understood, however, that the total signal input to the receiving station may comprise a number of additional signals, all except the desired signal representing components of interference. The system above may be utilized to select any one of a plurality of such signals, substantially without interference from the other signals present in the total signal input to the receiving station.

The system may also be utilized to reduce interference from unwanted signals appearing at the input of the receiving station, which are not intelligence modulated such as, for example, the frequency functions of stray interference, whether from natural or man-made causes.

It is therefore an object of this form of the present invention to provide a receiving method capable of receiving without interference, communications emitted by conventional methods in crowded portions of the frequency spectrum.

Another object is to eliminate the effects of Doppler shift interference in the reception of long range multi-hop signals.

A still further object is to provide a method for receiving a plurality of signals emitted by conventional means, arranged to transmit a plurality of intelligence-modulated signals within the frequency bandwidth conventionally allocated for one such signal. It will be apparent to those trained in the art, that such plurality of conventional transmitting means may be designed for secrecy operation when the receiving method of the invention is adapted to receive coded messages sent by permutation among a plurality of communication channels transmitting within a single signal bandwith, but with one or more of such channels modulated by noise. The composite function of such intelligence, masked by noise, will be unintelligible when detected by conventional receiving methods of prior art.

In this form of the invention, several independent signal-modulated emissions are modulated upon separate carrier wave components of equal frequency, but phase displaced with respect to each other, and the composite of the three carrier-waves is transmitted.

At a receiving station, the composite wave is received, and the functions of amplitude modulation and phase modulation detected from the received wave, are reconstructed upon two quadrature components of a local-wave generated at the receiver, so as to substantially represent the total signal input of the received wave. This reconstructed signal-wave is so related to large components of the local-wave in the manner before described, that two opposing phase components of the local-wave are in phase quadrature relationship with the constant relative phase of two phase-aiding components of the desired carrier wave, in which case the other carrier-waves represented by the reconstructed signal-wave differ from the quadrature relationship by the values of their respective phase differences with the desired wave.

The functions of the desired carrier wave therefore disappear in the sum of the detected products of both large local-wave components, but the remaining products representing the detected functions of the unwanted carrier waves are amplified and applied, through inverse amplitude modulation on both local-waves, to produce negative feedback upon the unwanted functions. The desired carrier wave is then detected as phase modulation upon either one or both local-wave components, whereby the desired signal appears as a fundamental wave substantially free from interference, according to the method previously referred to.

The object of this form of the invention is to provide a method of transmitting and receiving a plurality of carrier waves of equal frequency, to simultaneously communicate a plurality of independent messages within the frequency bandwidth conventionally allocated to one such message.

In another application of the invention, the local-wave of the receiving system is expanded to the proportions of a carrier-wave for the transmission of intelligence simultaneously with the detection of a signal which it is desired to receive; both the transmission of intelligence and the reception of the desired signal taking place within the same conventional frequency bandwidth allocation.

In this application, a carrier-wave is generated and modulated by intelligence, and the modulated carrier-wave is applied to the transmitting means, such as an antenna. The transmitting means will also serve as a receiving means, and will convey, in addition to the transmitted carrier-wave, a signal for reception. The amplitude modulations representing the transmitted intelligence are caused to cancel at the receiver input by combination with an equal and opposite component of the intelligence-modulated carrier-wave.

The signal it is desired to receive will appear at the receiver input with a substantially reduced component of the transmitted intelligence offering negligible interference.

The detection of the desired signal thereafter follows the method of the receiving system described in the previous example, except that, in this case, the method is carried out in the presence of a simultaneously transmitted carrier-wave.

The object of this form of the invention is the simultaneous two-way single-bandwidth communication of intelligence.

It will be apparent to those trained in the art, that as the result of simultaneous transmission and reception, numerous reflections from surrounding objects, and from the ionosphere, will also appear at the receiver input, with variable periods of delay so as to represent components of interference with the desired signal. Since the receiver method hereinbefore described is capable of substantially reducing the effect of such variable phase relations as are representative of frequency-difference components of interference with the desired signal, the interference value of delayed reflections of the transmitted carrier-wave is less than the interference value of the carrier-wave itself and, as has been said, this is substantially canceled at the receiver input. But the delayed reflections of the transmitted wave are nevertheless present and may be individually or collectively detected.

It is therefore a further object of this invention to provide a method of continuous automatic ranging to convey information about objects in the field of transmission and about the distance separating communication stations in the field.

Figure 1:
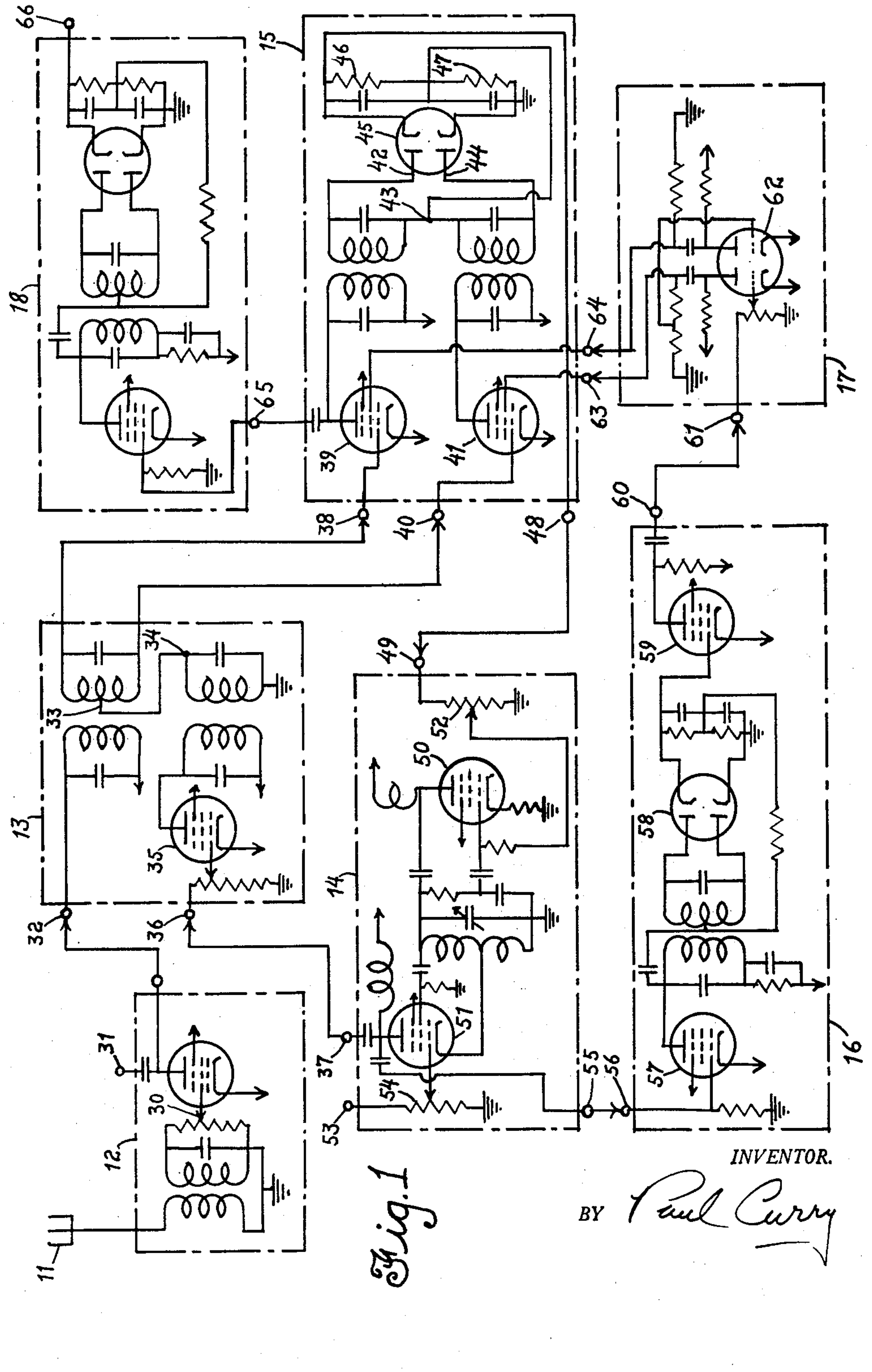
FIG. 1 is a schematic wiring diagram of one form of the invention as a receiver using two opposing local-wave components in phase quadrature with a received signal.

The novel features which are considered as characteristic for the invention are set forth in particular in the appended claims. The invention itself, however, together with additional features, objects and advantages thereof, will best be understood from the following description of the specific embodiment when read in connection with the accompanying drawings in which:

*The receiving system of FIG. 1*

Since several forms of the invention will be considered, a general description of the operation of each form will be given in conjunction with consideration of each of the specific steps or the specific circuits illustrated in the drawings. Referring first to the schematic circuit diagram of FIG. 1 where the components of the blocks represented by units 12 to 18 are shown, the power supply and the connections thereto from the various elements of the figure are not shown, since the means for accomplishing such connections are well known in the art. Such connections as will be understood in the art to require connections through the power supply, such as the termination of the plate, screen and cathode leads of the various receiving tubes used, are shown terminated by an arrow head, unless otherwise found necessary to clarify the circuitry. Only such connections as are concerned with signal continuity are indicated in order to allow greater clarity of description.

Under the conditions to be described in connection with FIGS. 1 and 2, the several wave functions involved in the operation of the invention will be more readily understood by reference to the vector representations shown in FIG. 2. Unless otherwise dictated by the need for greater clarity of description, the reference characters describing the vectors of FIG. 2 will be employed for reference to the various wave functions and their relationships in the units of FIG. 1 as well as the structures described in the subsequent figures.

The signals received by antenna 11 of FIG. 1 are amplified in antenna input amplifier 12 and applied to one input of wave mixer 13. It will be assumed that the signal input to antenna 11, amplified in antenna input unit 12, and applied to the input of mixer 13, comprises two independent carrier-waves, having a small frequency difference which is detectable within the audio bandwidth of a conventional transmission as, for example 100 or 200 cycles.

While the invention is not limited to the use of amplitude modulation, this form of modulation is preferred. Later the use of low-deviation frequency modulation will also be demonstrated.

The two said carrier-waves will be amplitude modulated by independent signals, and so closely spaced in frequency, that conventional receiving methods of prior art will be unable to separate their composite functions. As a first step in detecting the functions of a particular one of the carrier-waves, substantially without interference from the other carrier-wave, the composite signal is mixed with a locally generated wave applied to the second input of unit 13 from one output of the generator modulator 14. This local-wave, of equal frequency with a selected one of the signal waves, is combined with it in unit 13, in such quadrature phase relationship, that one component of the combination apeparing at one output of unit 13, will have a quadrature phase difference between the local-wave and the signal-wave, which is opposite to that of a second equal component, appearing at the other output.

Referring to FIG. 2A, this opposite quadrature relationship is portrayed by the vectors $L_1$ and $L_2$, representing two opposing-phase components of the local-wave, in quadrature with the composite vectors $C_1$ and $C_2$, representing the aiding-phase components of the received wave.

The two vectors $C_1$ and $C_2$ are shown here to also be in aiding-phase, but in FIG. 2B, the vector $C_2$ is shown to have rotated its phase position with respect to $C_1$, and the composite wave is represented by the dotted line $C_0$. It is seen that the components $L_1$ and $L_2$, representing the local-wave, are again in quadrature with the composites $C_0$, having advanced in phase with the advancing phase of $C_0$.

To achieve brevity consistent with clarity of description in the present disclosure, it is thought advisable to use vectors insofar as it is necessary to portray the various wave positions and their phase differences, which are all important in the interest of completeness. While many of those trained in the art might prefer the more classic definitions, it is believed that the disclosure to follow will not lose force if vector presentations are coupled with a definition of terms as here used, and which are in accord with their use by authorities in the field.

In the use herewith of vector presentations, it will be understood that a vector of constant length $I_m$, rotating at an angular velocity $\Omega$, will have an instantaneous value $I_t=I_m \sin (\Omega_t+\theta)$. It is then said to have a constant relative phase $\theta$. To achieve brevity, it may also be referred to as "constant relative phase" or simply "relative phase." If at a particular instant the value $\theta$ is $\pi/2$, and the vector thus points to the positive sine position of 90 degrees, it is understod that this position, being only instantaneous, is not unchanging. At a later instant, when $\theta$ becomes $2\pi/3$ the vector, still of constant length, points to a position of 120 degrees, and so on, as it moves throughout its multiple cycles with the angular velocity $\Omega$.

When this vector is affected so as to vary either its length $I_m$, in the case of amplitude modulation, or its angular velocity $\Omega$, in the case of frequency modulation it is customary to add modulation products, the instantaneous values of which are represented by additional vectors which, in their respective sums, constitute the value of the modulation product $I_m \sin \omega t$ for amplitude modulation, or the modulation product $\Delta\theta \sin \omega t$ for phase modulation. The constant relative phase $\theta$ for each of the additional vectors representing modulation products, is dependent on the instantaneous phase position of the fundamental wave by which the constant vector $I_m$ is modulated. This instantaneous phase position of the fundamental wave is referred to herewith, as the phase angle $\varphi$.

Returning now to FIG. 2B, it may be assumed that the carrier-wave represented by the vector $C_1$ is the signal which it is desired to receive, in which case $C_2$ is to be rejected. The manner in which the local-wave is caused to select this carrier-wave will be later described. Under the circumstances now being discussed, the component of the local-wave represented by $L_1$ in combination with the composite carrier-wave represented by $C_0$, forming the quadrature composite $Q_1$ of FIG. 2B will appear at one output of wave mixer 13, and is applied to one input of discriminator-degenerator 15, while the opposite quadrature component $Q_2$ at the other output of unit 13 is applied to a second input of unit 15.

The unit 15 discriminates the phase differential resulting from the change in relative phase of the composite $C_0$, due to the difference in frequency between the carrier-waves $C_1$ and $C_2$. This difference is shown in FIG. 2B by the rotating arrow $\Delta\theta$, and appears at one output of unit 15 as a voltage having either a negative or a positive polarity, depending on the direction of the phase differential of $C_2$ with respect to $C_1$. It may here be noted that if the carrier $C_2$ were the selected wave, the rotating arrow $\Delta\theta$ would be represented by the oppositely rotating arrow of FIG. 2D.

This output voltage is applied to one input of generator-modulator 14 where it causes the local-wave to accelerate or retard its relative phase the required amount to maintain its quadrature relationship with the composite $C_0$.

As previously stated, the local-wave energy appearing at one output of unit 14, is applied to an input of wave mixer 13.

Part of the local-wave energy appearing at another output of unit 14 is applied to the input of local-wave discriminator 16, where variations in the phase of the local-wave, due to the wave of frequency difference between carriers $C_1$ and $C_2$, are translated into a representative fundamental wave. This fundamental wave is amplified in unit 16, and appears at the input of the audio inverter unit 17. Unit 17 is an audio phase inverter of the type commonly used to convert a single-ended signal, i.e., unbalanced to ground, to a push-pull or balanced signal, the object being to provide amplified signals of equal and opposite polarities at the two outputs of unit 17 from the single signal applied to its input from the local-wave discriminator 16.

The two equal opposing waves from the output of unit 17, now being amplified functions of the wave of phase modulation of the local-wave caused by frequency difference between carriers $C_1$ and $C_2$ are applied to two other inputs of unit 15, where they are caused to amplitude modulate each of the components $L_1$ and $L_2$ of the composite waves $Q_1$ and $Q_2$, FIG. 2C, in opposite sign to the direction of the frequency difference between carriers $C_1$ and $C_2$.

This constitutes the application of inverse feedback on both local-wave components $Q_1$ and $Q_2$, and results in the reduction of the carrier amplitude of $C_2$ by the sideband of amplitude modulation, represented by the dotted vector S, while the other sideband represented by the dotted vector I, appears as a new carrier component $C_3$, also much reduced by succeeding cycles of negative feedback. As a further result, the wave of phase variation of the local-wave which first gave rise to the components of inverse feedback, is substantially reduced.

A portion of the signal energy represented either by $Q_1$ or $Q_2$, for example $Q_1$, appears at the output of unit 15, and is applied to the input of the signal discriminator 18 where the phase modulations of $Q_1$ are detected, and appear at the output of unit 18 as the fundamental signal-wave modulating the desired carrier $C_1$, substantially without interference from the carrier $C_2$ or its complements of signal modulation.

Under the conditions described in connection with FIG. 1, it may be assumed that the antenna 11, which receives the desired signal as well as the unwanted carrier-waves, is a receiving means for which may be substituted one of a pair of conductors, and the other conductor is connected to ground, as will be the case when signals are transmitted and received by wire.

The resonant network and the pentode tube in antenna input amplifier 12 which are associated with the process of amplifying the signals appearing on antenna 11, are well known and do not require description except to note that the ratio of the signal amplitude to the amplitude of the local-wave is adjusted by means of the volume control 30. The output 31, shown unconnected, is not used in connection with this form of the invention, but will be mentioned in connection with the use of this unit in other forms, in connection with FIGS. 4 and 5.

In general, the resonant networks of this and other units to be described will be designed to pass the carrier-wave and its respective sidebands which it is desired to receive, with minimum attenuation and phase distortion, and thus will conform to good practice in the design of their bandwidth capabilities.

Under such conditions, the amplified signals appearing at the output of unit 12, which are applied to input 32 of wave mixer 13, are substantially representative of those received by antenna 11.

Figure 2:
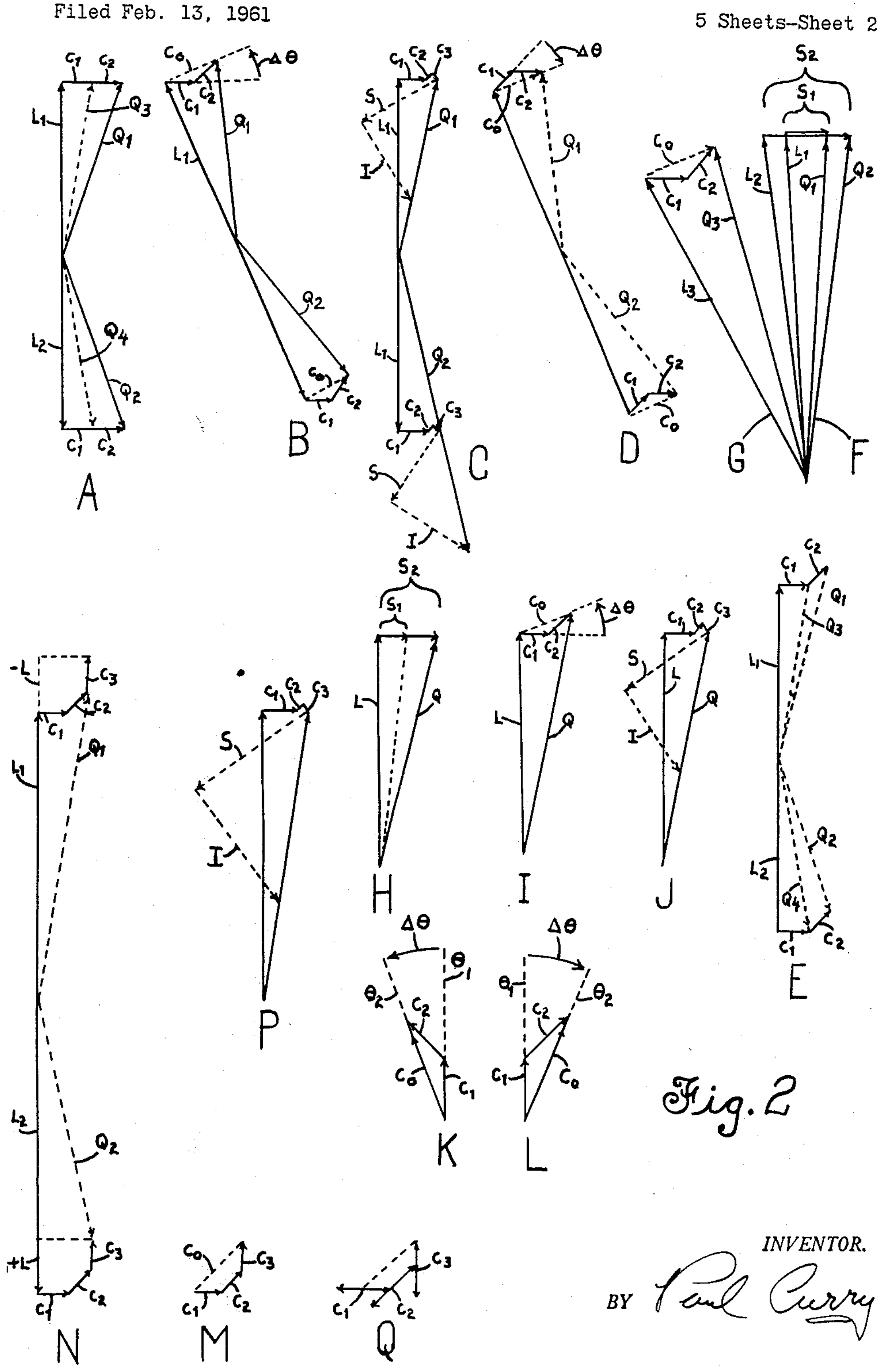
FIG. 2 is a vector representation of the phase relations between a local-wave and the carrier-waves of a received signal.

These signals which, as described, comprise the desired carrier-wave and the unwanted carrier-wave, designated as $C_1$ and $C_2$ in FIG. 2, pass through the resonant transformer the secondary of which has a center-tap 33 which is connected to the resonant transformer secondary output 34.

A local-wave, adjusted to have equal frequency with the desired carrier $C_1$, and to have quadrature phase relationship with it, as will be further described, appears at output 34, after amplification in pentode tube 35, of the local-wave component applied to input 36 from output 37 of generator-modulator 14.

The local-wave from transformer output 34 as applied at center-tap 33, combines with the composite carrier-wave from input 32, designated in FIG. 2B as $C_0$, so as to apply at input 38, of unit 15, the composite quadrature wave designated as $Q_1$ in FIG. 2, and at input 40 of unit 15, the composite wave designated as $Q_2$.

The input 38 is applied to one input of converter tube 39, while the input 40 is applied to one input of converter tube 41.

The output of converter 39 is associated with a resonant network tuned to the center frequency of the desired carrier-wave, and with appropriate bandwith characteristics, applies the component $Q_1$ between the plate input 42, of twin diode rectifier 45, and common connection 43. The output of converter 41, also associated with its own resonant network, applies the component $Q_2$ between the plate input 44 of twin diode rectifier 45 and common connection 43.

The quadrature component $Q_1$ produces, after rectification by its separate half of twin diode 45, a voltage across resistor 46.

The quadrature component $Q_2$ produces, through rectification by its separate half of twin diode 45, a voltage across resistor 47, which is opposite in polarity to the voltage developed across resistor 46.

The output 48, of unit 15, is applied to the input 49 of modulator-generator 14, and connects with the input of reactance modulator tube 50 which, with its associated networks, is designed to control the frequency of the oscillating networks associated with the oscillator-modulator tube 51.

Figure 3:
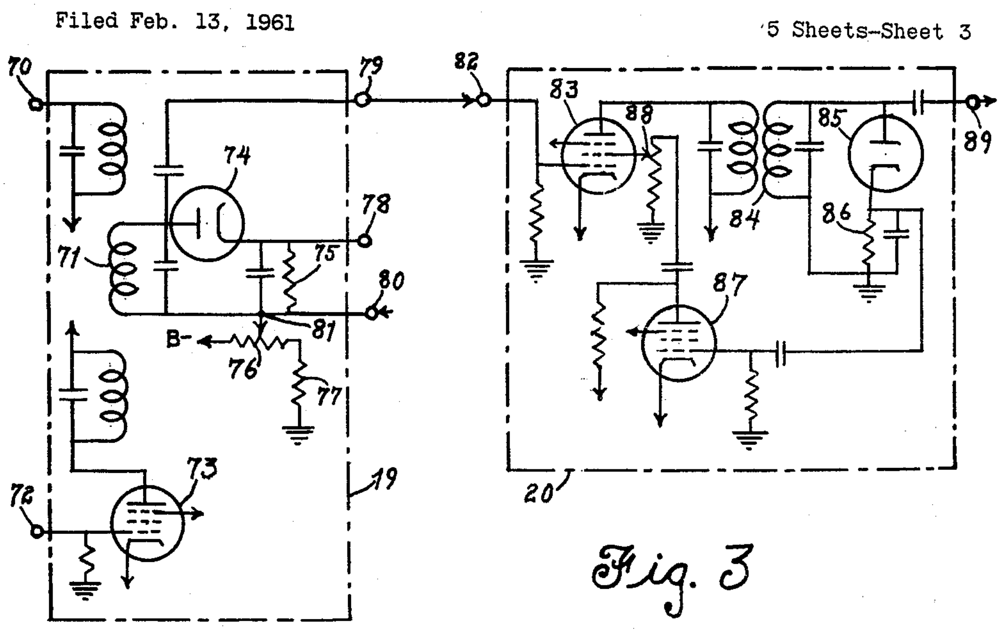
FIG. 3 is a schematic wiring diagram of the means for employing one local-wave component in phase quadrature with the received signal.
Figure 4:
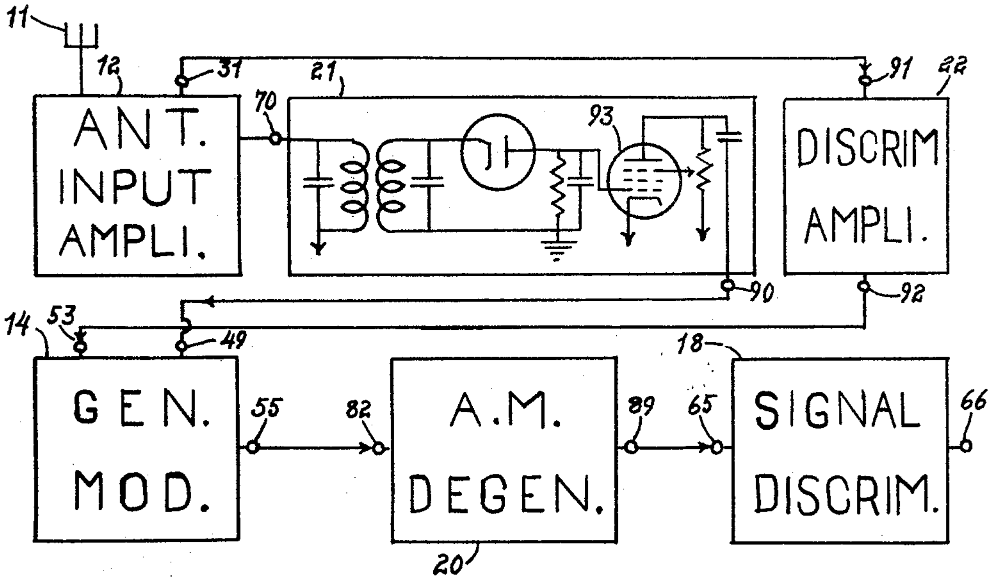
FIG. 4 is a combination diagram for employing quadrature inversion of signal functions in a receiver.

The reactance-modulator network associated with tube 50, and the oscillator network associated with tube 51 the frequency of which it controls, are well known, and require no further description except to note that the volume control 52, included in the network of input 49, as the adjustable means controlling the degree of frequency control exercised by the reactance modulator, will also be the adjustable means in connection with the use of the unit 14 in the structures of FIGS. 3 and 4. The input 53, and its associated volume control 54, not here used, will however be employed in conjunction with the structure of FIG. 4, later to be described.

Under conditions of balance, as is the case when each of the two equal local-wave components $L_1$ and $L_2$ is in exact quadrature phase relationship with its respective carrier-wave component, and both carrier-waves $C_1$ and $C_2$ are momentarily in exact aiding-phase, as represented by the vector relationships shown in FIG. 2A, the voltages developed across resistors 46 and 47 are equal and opposite, and produce a zero potential between the output 48, of unit 15, and the ground return shown on one side of resistor 47.

After the momentary condition of balance above referred to, the carrier-wave represented by $C_2$ in FIG. 2A, will rotate its constant relative phase from its exact aiding-phase relationship with the carrier-wave represented by $C_1$, to assume the relative phase position represented in FIG. 2E. This is, of course, due to the frequency difference between the carrier-wave $C_2$ and $C_1$. Here it is apparent that the voltage developed by $Q_1$ across resistor 46, of unit 15, is greater than the voltage of opposite polarity developed by $Q_2$ across resistor 47. The difference, favoring the polarity developed by $Q_1$, appearing at output 48 and applied to input 49 controls the frequency of the local-wave developed by generator-modulator 15 sufficiently to advance the phase of the local-wave components $L_1$ and $L_2$ to achieve a new condition of equality between the quadrature vectors $Q_1$ and $Q_2$, as shown in FIG. 2B.

A condition of constant equality between $Q_1$ and $Q_2$ is achieved without variation of the constant relative phase of the local-wave output when a single carrier-wave is being received at antenna 11, without interference from other frequency-different functions. This case is represented in FIG. 2A, where the vector $C_1$ represents one amplitude value and the sum of $C_1$ and $C_2$ represents a second amplitude value as would be the case if a single carrier-wave were amplitude modulated by a signal. For the first value of amplitude represented by $C_1$, the corresponding quadrature vectors $Q_3$ and $Q_4$ would develop equal voltages across resistors 46 and 47 of unit 15, respectively. And for the sum of $C_1$ and $C_2$, the corresponding vectors $Q_1$ and $Q_2$ would again develop equal and opposite voltages across the respective resistors 46 and 47.

The interference component represented by variation of the relative phase of $C_2$ with respect to that of $C_1$ which has caused variation of the relative phase of the local-wave, and consequently adjusted the quadrature components $Q_1$ and $Q_2$ to a new condition of equality, through the respective networks of units 14 and 15 described, results in the phase variation of a component of the local-wave applied to output 55, of unit 14, which is applied to input 56, of local-wave discriminator 16.

Frequency discriminating structures similar to that shown in unit 16 are widely used in the process of translating frequency or phase variations of a wave of constant amplitude into corresponding variations in amplitude consituting a fundamental function of the wave of frequency or phase variation. The components shown in unit 16, FIG. 1, are well known and require no further description except to note that the local-wave component appearing at the input to amplifier tube 57, produces at the input to amplifier tube 59, after frequency discrimination by the filter and resonant networks associated with twin diode rectifier 58, a fundamental wave of appropriate polarity to substantially represent the wave of phase advance and delay required to maintain the local-wave components $L_1$ and $L_2$ in quadrature phase relationship with the composite carrier-wave $C_0$, as shown in FIG. 2B.

This fundamental wave, after amplification by tube 59, appearing at the output 60, of unit 16, is applied to input 61, of audio inverter 17.

The phase inverter network enclosed by unit 17 also is well known as a conventional device whose simple function is to convert a single-ended signal (such as the fundamental function applied to input 61) to a push-pull or balanced signal.

Its use in the present form of the invention is to provide, after phase inversion and amplification by the twin triode amplifier 17, and its associated networks, including twin triode 62, two equal components of opposite polarity representative of the fundamental wave applied to the input 61.

One component of the fundamental wave appearing at the output of unit 17, is applied to the input 63, and the other equal but opposite-phase component is applied to the input 64, of discriminator-degenerator 15.

Input 63 is connected to one input of converter tube 41, while input 64 is connected to one input of converter tube 39, of unit 15. The application of the two equal and opposing phase components of the fundamental wave to the inputs of converters 39 and 41 causes amplitude modulation of the respective components represented by $Q_1$ and $Q_2$ in FIG. 2B, and the polarity of the component applied to each converter is such as to amplitude modulate the components $Q_1$ and $Q_2$ in a direction opposing the polarity at the output 48, of unit 15, which gives rise to the fundamental wave, through the cooperation of units 14 and 16, previously described.

This constitutes the application of inverse feedback on the interference value of the carrier-wave represented by $C_2$ in FIG. 2B, and may best be understood by reference to FIG. 2C.

Here it should be noted that the relative lengths of the various vectors displayed in FIG. 2 are not truly indicative of the actual amplitudes of the components waves in the actual operation. Though the invention will operate with the relative amplitudes as shown, it is most effective when the ratio of the components $L_1$ and $L_2$ are very large compared to the amplitude of the composite signal $C_0$, in which case the quadrature components $Q_1$ and $Q_2$ closely approach the phase of the respective components $L_1$ and $L_2$, which they comprise.

But it is not possible to properly convey the idea of the invention with the component $L_1$ equal to more than one thousand times the amplitude of the composite carrier-wave $C_0$, for example. Thus, the vector lengths shown in FIG. 2 should be read with this qualification in mind. FIG. 2 is intended merely as a means to achieve clarity of description consistent with appropriate brevity, since the features cited will be understood by those trained in the art.

Returning to FIG. 2C, the vectors S represent the superior sidebands and the vectors I, the inferior sidebands resulting from the amplitude modulation of the quadrature component Q, by the fundamental waves at the inputs 63 and 64, of unit 15.

Since the sidebands S and I on the component $Q_1$, advance in the same direction as the sideband pair S and I, on the component $Q_2$, but $Q_1$ opposes $Q_2$, it is seen that the amplitude modulation on $Q_1$ is opposite to that on $Q_2$.

As is well known in the art, the amplification of signals in the presence of negative feedback reduces the constant by which the signals are amplified, in accordance with the factor $$\frac{A}{1-AB}$$

when $\varphi$ is restricted to $\pi$, where A is the amplification factor and B is the feedback network attenuation without feedback.

While the constant relative phase of the component $Q_1$, differs from that of $L_1$ by an amount dependent on the amplitude of the carrier component $C_0$, in quadrature with $L_1$, the value of $\varphi$ in the feedback equation is sufficiently close to $\pi$ to assure stable operation.

The sideband S, as seen in its relation with the quadrature component $Q_1$, in FIG. 2C, opposes the interfering carrier component $C_2$, and the reduced length of the vector $C_2$, as compared to its length in FIG. 2B, for example, is indicative of the reduction, but not of the exact degree to which it is reduced by the negative feedback in any specific example.

If, for example, it is assumed that the value of B in the feedback equation is .49, and the constant A by which the signals are amplified is 100, the combined value of $1-A$ is 50, and the constant A is reduced to 2. The effect on the interfering component $C_2$ will be that of reducing its amplitude by a factor of 50. As far as its relationship with the desired carrier $C_1$ is concerned, if both were of equal amplitude as received by antenna 11, the amplitude of $C_2$ is on the order of $1/50$ the amplitude of $C_1$.

The components of negative feedback due to the sideband S on both quadrature components $Q_1$ and $Q_2$, are imposed on each carrier component $C_2$. But the sidebands represented by the I vectors in FIG. 2C, not being in opposition to any primary waves in the composite carrier-wave, in effect generate components represented by $C_3$ which, in turn, are substantially reduced by additional cycles of negative feedback.

The process of inverse feedback above described, has been imposed upon the quadrature components $Q_1$ and $Q_2$, in which case the phase angle $\varphi$ of the inverse component is not exactly $\pi$, or 180 degrees. While the negative feedback may be imposed upon the local-wave components $L_1$ and $L_2$, instead of the quadrature components $Q_1$ and $Q_2$, it is believed that the present form of disclosure more clearly demonstrates that the invention is not limited to the exact value of $\pi$ for the phase angle $\varphi$ of the negative feedback.

Another important result of the application of inverse feedback, as described above, is the fact that the phase variation of the local-wave components $L_1$ and $L_2$, caused by the rotating vector representing the interfering carrier-wave $C_2$, is also substantially reduced by the opposing feedback, as shown in FIG. 2C.

A portion of the quadrature wave, for example $Q_1$ (although $Q_2$ may be used with equal effectiveness), is applied from the output of unit 15 to the input 65, of signal discriminator 18.

The unit 18, like the local-wave discriminator 16 previously described requires no further discussion beyond explaining that the phase modulation on the quadrature component Q, appearing at its input 65, is translated into a fundamental component representative of the signal amplitude modulations on the desired carrier-wave, designated as $C_1$ in FIG. 2, and this fundamental wave appears at the output 66, substantially free from interference by the unwanted carrier-wave designated as $C_2$, or from the component produced by negative feedback, designated in FIG. 2C, as $C_3$.

It is understood that higher degrees of inverse feedback may be employed to achieve greater rejection of unwanted frequencies. Further, the number of independent interference functions appearing in the total antenna signal input may be increased to 2 or more. In fact, one form of the invention will present a method designed to discriminate between at least three independent carrier-waves operating within a common frequency bandwidth.

*Receiving system of FIG. 3*

In the receiving system of FIG. 1, described in connection with the vector display of FIG. 2, it was shown that the features of the invention may be effectively carried out when two equal and opposing phase components of the local-wave in combination with two equal and aiding phase components of the signal-wave produce a sum in which the desired signal is cancelled, and the unwanted signals produce components of negative feedback, to reduce the amplitudes of the unwanted waves, but the desired signal is detected from the phase modulation of the local-wave.

A method will now be described in connection with FIG. 3, in which only one component of the local-wave is combined with a single component of the received signal, to carry out the unique features of the invention.

Under the circumstances here to be described, it may be assumed that the signal output of the antenna input amplifier unit 12, FIG. 1, is applied to the input 70, of wave mixer degenerator 19, FIG. 3, which combines the functions of both the wave mixer 13 and the discriminator degenerator unit 15, of FIG. 1.

The signal at the input 70, through its associated resonant network, is inductively transferred to secondary winding 71 which, with its associated network, forms a band-pass filter designed to pass the signal components received by antenna 11, and amplified in unit 12, FIG. 1, with minimum attenuation or phase distortion.

The local-wave output 37, of the generator modulator unit 14, FIG. 1, is here applied to the input 72 of unit 19, instead of to the unit 13, FIG. 1, through the function of amplifier tube 73, to the input of which it is connected, and the resonant network associated with its output, is similar to that of amplifier tube 35, of unit 13.

The local-wave, amplified and appearing at the output of tube 73, is transferred through its resonant transformer primary, to the secondary winding 71, where it combines with the signal component inductively transferred from the primary winding connected with the input 70.

The sum of the local-wave and the signal-wave appears, after rectification by diode 74 and appropriate filtering by its associated network, as a voltage across diode resistor 75. One side of resistor 75 is connected to ground return at common connection 81, through the variable resistance of potentiometer 76, and the limiting resistor 77 to develop a voltage in series with resistor 75 which is opposite in polarity to that developed by rectifier 74 from the local-wave and signal in combination. This opposing voltage is developed by the connection of one end of the potentiometer to a source of constant negative potential with respect to ground, as indicated by the arrow head pointing to the reference character B—. With this potentiometer properly adjusted, the voltage balance favoring the rectifier product at its output 78, will be on the order of the greatest amplitude of the signal input from antenna unit 12.

The output 78 is applied to input 49, of generator modulator 14, FIG. 1, where it causes phase modulation of the local-wave output of the unit 14 which, as previously shown, is applied to the input 72, of unit 19.

As a result, the voltage balance at the output 78, of unit 19, will tend to approach a steady state, but the wave appearing at the output 79, being the sum of the local-wave and the signal component, will be phase modulated to a substantial degree by the wave of frequency difference between the desired signal and the unwanted signal appearing in the total signal at input 70, of unit 19.

The phase relationships of the local-wave and the carrier-wave components in the signal input which are combined in resonant winding 71 may be more easily understood by reference to FIG. 2, F and G.

At FIG. 2F a component $L_1$ of the local-wave, is shown in combination with a single carrier-wave $S_1$ to produce the resultant $Q_1$. Projected from the same origin of the vectors $L_1$ and $S_1$, as well as $Q_1$, is the component $L_2$ whose length is equal to that of $L_1$ but its constant relative phase has been advanced by its combination with a larger carrier-wave $S_2$, to produce a resultant $Q_2$, whose length is equal to that of $Q_1$, but the constant relative phase of which has been retarded by a degree equal to the phase advance of $L_2$ over $L_1$.

But in FIG. 2G, two carrier-wave components $C_1$ and $C_2$ are shown in phase differential relationship representative of the frequency difference of $C_2$ with respect to $C_1$. As a result, the local-wave component $L_3$, which is of equal amplitude with both $L_2$ and $L_1$, has assumed a relative phase representing a much greater phase advance than is the case for $L_2$. The resultant $Q_3$, also equal to $Q_2$ and $Q_1$, here shows a phase advance instead of a phase delay as in the case of $Q_2$.

It is apparent from the above relationships, that amplitude variations of a signal in which no phase variations are present (as is the case for a single carrier-wave amplitude-modulated by a signal) produces minor variations in the relative phase of the local-wave; whereas phase variations in the signal input (as is the case for two or more frequency-different signals) produces major variations in the relative phase of the local-wave.

Such characteristic variations of the phase of the local-wave caused by the application of the voltage output 78, of wave-mixer-degenerator 19, to the input 49, of the generator-modulator 14, in the manner previously described for the unit 14 in connection with FIG. 1, are reflected in the component of the local-wave appearing at output 55, of unit 14, and are applied to input 56 of the local-wave discriminator 16, the function of which has also been explained in connection with FIG. 1, and needs no further description except to note that the phase variations of the local-wave appearing at its input, which are translated into a fundamental wave, amplified, and appearing at its output 60, are applied to the input 80, of the wave-mixer-degenerator 19, where its application to common connection 81, opposes the wave of amplitude modulation of the voltage wave across resistor 75, due to variation of the relative phase of the input signal with respect to the local-wave component.

This constitutes the application of negative feedback on the amplitude modulation of the voltage wave across resistor 75 causing the original phase modulation of the local-wave, and results in the substantial reduction of the phase excursions. Referring to FIG. 2H, it may be seen that the two vectors $S_1$ and $S_2$ which, when taken to represent at two instants, two degrees of amplitude modulation of a single carrier-wave of constant frequency, show no variation of the constant relative phase of the local-wave L.

It should here be noted that the above represents the ideal case. In the actual case, the constant relative phase of the local-wave will show variation, but to such a small degree that the unvarying vecor L, may be assumed to be substantially representative, since the projection of two vectors on the scale of FIG. 2, differing by a fraction of a degree, would be meaningless.

For the sake of clarity of description, therefore, it may be assumed that the vector L does vary to a small degree, but not to such an extent as to substantially affect the operation of the invention.

If it is assumed, as above indicated, that the vector L is substantially unvarying, it is apparent that both signals represented by $S_1$ and $S_2$ are in substantial quadrature phase relationship with the local-wave L.

The effect on the resultant wave, Q, however, is to vary its constant relative phase to a minor degree, and to amplitude modulate the resultant, also to a minor degree.

Attention is again called to the fact that the scale represented in FIG. 2, does not permit the projection of vectors having high ratios of length such as, for example, more than 1000 to 1, which would be the case in the contemplated operation of the invention where the local-wave is very large compared to the signal it is desired to receive.

In such an actual case, the degree of phase variation of the resultant wave Q, and the incident amplitude modulation shown in FIG. 2H, would both be much smaller than here represented.

In FIG. 2I is represented the case where, as before discussed, the unwanted carrier-wave $C_2$ has a frequency difference with respect to the desired carrier-wave $C_1$. Here is shown the substantial degree of amplitude modulation of the resultant wave Q, representing the wave of frequency difference between the two carrier-waves.

A portion of the resultant wave Q, appearing in the resonant winding 71, and applied to the output 79 of unit 19, is connected to the input 82, of the A.M. degenerator 20.

The function of the unit 20, consists of deriving the fundamental functions of amplitude modulation of the resultant wave Q, representing the wave of frequency difference between the desired signal, and components of interference such as the unwanted carrier-waves, having their signal bandwidths substantially within the bandwidth of the desired signal; and, after amplification of these fundamental functions, applying them as negative feedback on the original functions to reduce their values of interference with the desired signal.

In the process to be described, the resultant Q is connected from the input 82, to one input of converter tube 83, through which it appears in the resonant network associated with its output from which it is inductively transferred to the secondary winding 84 and its resonant network, cooperating with rectifier tube 85, to produce a voltage wave across diode resistor 86, upon which are added the amplitude variations representative of the interference components.

The elimination of the individual waves of the resultant, Q, and the development of the direct potential across the resistor will be accomplished by the associated capacitive elements shown in unit 20. The above described fundamental wave will be amplified in amplifier tube 87, and applied to the second input, 88, of converter tube 83.

This constitutes again, the application of negative feedback, as can be seen by referring to FIG. 2J. As before explained, in connection with FIG. 2C, the sideband S, of the amplitude modulation imposed on the resultant wave Q, opposes the interfering carrier-wave $C_2$, thus substantially reducing its amplitude, while the sideband I, produces an additional component designated as $C_3$ in the figure, but which however, is also substantially reduced by successive cycles of negative feedback.

The resultant Q appears, with the functions of interference now reduced by negative feedback, in the secondary winding 84. A portion of this total wave appearing at the output 89, is applied to the input 65, of the signal discriminator 18, FIG. 1, where, as previously described, the phase variations of the resultant wave Q, are translated into a fundamental component representative of the signal amplitude modulations on the desired carrier-wave, designated as $C_1$, in FIG. 2, to appear at its output 66, substantially free from interference by the unwanted carrier-wave designated as $C_2$, or from the component produced by negative feedback, designated as $C_3$, in FIG. 2J.

As before explained, the system here described in its most fundamental simplicity for the sake of clarity of description, is susceptible of refinement, as will be envisioned by those trained in the art, so as to achieve the greatest rejection of unwanted frequencies, and this may be accomplished without departing from the fundamental method of the invention.

*Quadrature inversion of signal functions receiving system of FIG. 4*

In another form of the present invention, herewith to be described in connection with FIG. 4, the functions of amplitude modulation and the functions of phase modulation, of a particular received signal, are separately detected, and the products of detection are suitably amplified and separately applied to modulate a local-wave. But the detected products of amplitude modulation are applied as phase modulation of the local-wave; and the detected products of phase modulation are applied as amplitude modulation.

The phase relations of the various components of the local-wave, as now doubly modulated, are substantially, as previously described, in relation to the vector diagram of FIG. 21. As seen, the amplitude modulation of the local-wave, is actually a representation of the phase variation of the signal caused by the frequency difference between $C_1$ and $C_2$; and the phase variation of the local-wave is actually the corresponding component of amplitude modulation detected from the original signal. This is seen clearly by comparison of the respective functions indicated by the vector diagram of FIG. 2K, with those of FIG. 2I.

The means for detecting amplitude modulation components of a signal are so well known in the art that nothing would be added to clarity of description in the present disclosure by including a detailed description of any particular demodulating means operating on the envelope of the received signal. Under the circumstances here being described, it may be assumed that the A.M. detector-amplifier 21, of FIG. 4, which receives at its input 70, the amplified composite carrier-wave which is representative of the signal input to the antenna 11, will be adjusted to produce at its output 90, an accurate reproduction of the characteristics of amplitude modulation on the envelope of the received signal. It will be further assumed that the fundamental wave representing the amplitude modulation is also amplified.

While the means for detecting phase modulation components of a signal are also sufficiently well-known in the art to permit the use of a diagrammatic block such as the discriminator amplifier unit 22, of FIG. 4, to describe it, the details of a particular structure are described in connection with the local-wave discriminator 16, in FIG. 1. It may be assumed, however, that the unit 22 may incorporate other equivalent means such as, for example, various types of synchronized oscillators, some forms of which may incorporate electronic features like the gated-beam tube.

It should be noted, however, that in the use of a structure like unit 16, FIG. 1, the signal proportions and the tube parameters of the unit should be such as to limit the amplitude of the signals to remove all envelop variations before the phase variations of the signal are detected.

It will be assumed that a portion of the signal output 31, of the antenna input unit 12, is applied to the input 91, of the discriminator amplifier 22, to produce at its output 92, a fundamental wave substantially representative of the wave of phase modulation of the received signal.

It is well to point out that a single carrier-wave upon which a signal has been imposed by amplitude modulation, and from the envelop of which all amplitude variations have been removed before the process of phase discrimination, will show no phase deviation in a properly designed and adjusted discriminator.

The output 90, of unit 21, containing the fundamental wave of amplitude detection, is connected to the input 49 of the generator-modulator 14, while the output 92, of unit 22, containing the fundamental wave of phase detection, is connected to the input 53, of the unit 14.

In the generator modulator 14, the details of which are described in connection with FIG. 1, the fundamental wave of amplitude detection at its input 49, is caused to phase modulate the local-wave output of the unit, while the fundamental wave of phase detection at its input 53, is caused to amplitude modulate the local-wave output. Both forms of modulation on the local-wave, when properly adjusted in relationship of degree of the respective modulations, will produce a local-wave at the output 55, of the unit 14, which may be represented by the vector diagram I of FIG. 2, in the case of two frequency-different carrier-waves, now being discussed, and previously explained.

The local-wave output 55, in FIGS. 1 and 3, is connected to the input of the local-wave discriminator 16, for detection of its wave of phase modulation. But in FIG. 4 it is connected directly to the input of the A.M. degenerator 20, which as before explained in connection with FIG. 3, detects the functions of amplitude modulation on the local-wave (which are representative of components of interference with the desired signal), and applies them, after amplification, as components of negative feedback on the original components in the local-wave.

The local-wave, with its components of phase variation now related as shown by the vector diagram of FIG. 2J, is translated by the signal discriminator 18, to which it is connected and from the output of unit 20, already described, into a fundamental wave representative of the signal amplitude modulation on the desired carrier-wave, again free from interference by the unwanted carrier-wave. This appears, as shown, at the output 66, of unit 18.

Figure 5:
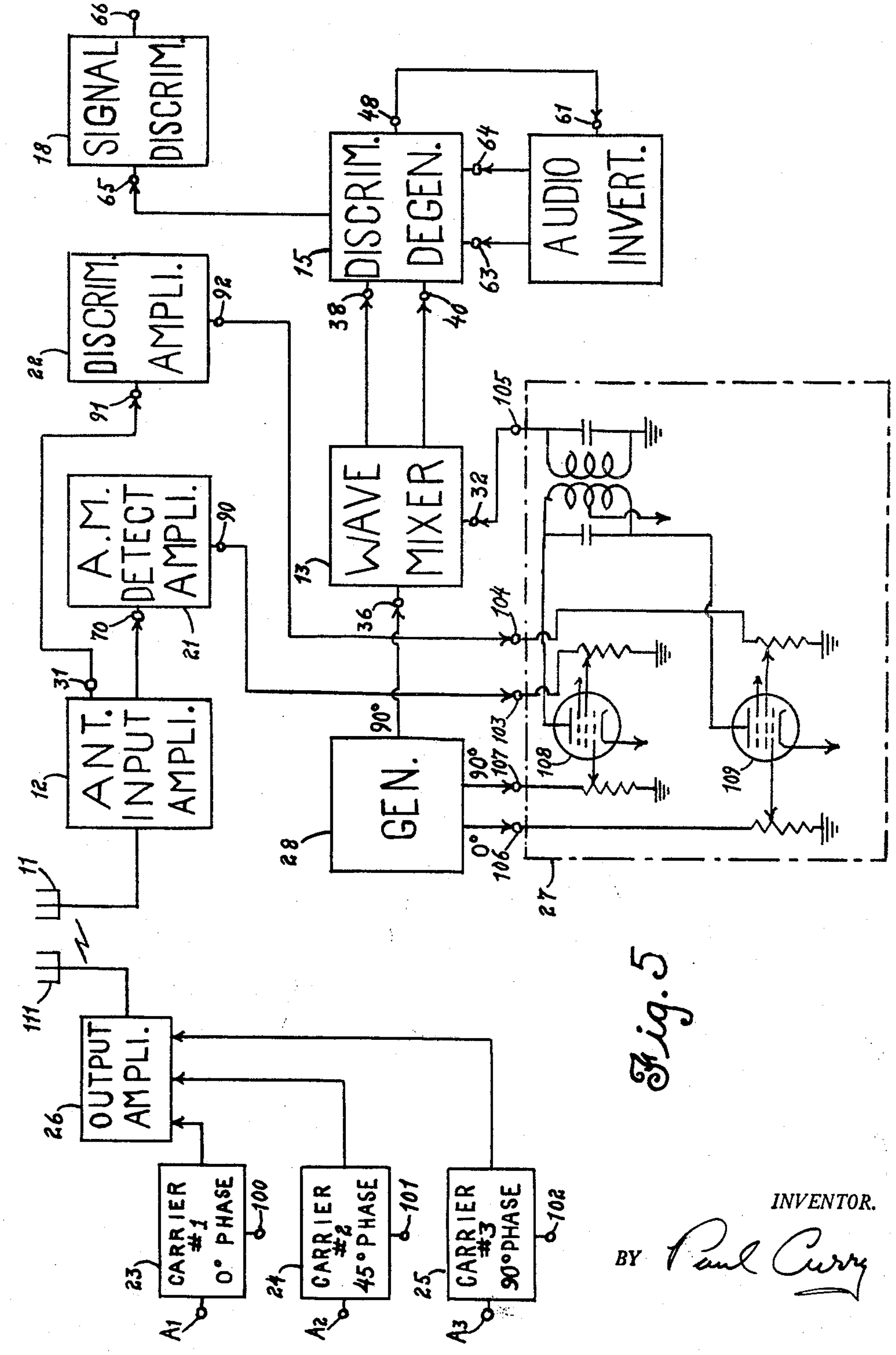
FIG. 5 is a combination diagram of a complete multiplex transmitting-receiving system.

*Transmitting-receiving system of FIG. 5*

As referred to hereinbefore, an application of the present inventiion makes possible the transmission of several independent signal-modulated emissions modulated upon separate carrier-wave components of equal frequency which, when operated in conjunction with another form of the receiving system described above, provides a novel system for multiplex transmission and reception.

Such a system will now be described in connection with FIGS. 2 and 5.

To carry out the unique features of this method, it will be assumed that the carrier-waves of equal frequency are generated at the transmitting station by means well known to the art and requiring no descripion here, since the details of construction are not pertinent to the method here to be disclosed.

It may be assumed, therefore, that whatever means are employed to generate the primary wave at the transmitting station, three components are derived which will be phase displaced with respect to each other. One such component, suitably amplified to the proportions of a carrier-wave, and having the constant relative phase of the primary wave, will be applied to input 100 of carrier-wave unit 23. This will be referred to as carrier #1, having a constant relative phase of 0 degree, and generally designated as $C_1$ in the vector representations.

The second component, with a constant relative phase which is advanced 45 degrees with respect to the first carrier component, will be applied to input 101 of carrier-wave unit 24. This will be referred to as carrier #2, having a constant relative phase of 45 degrees, and generally designated as $C_2$, in the vector references.

The third component, with a constant relative phase which is advanced 90 degrees with respect to the first carrier component, will be applied to input 102, of the carrier-wave unit 25. This will be referred to as carrier #3, having a constant relative phase of 90 degrees, and generally designated as $C_3$, in the vector diagrams.

Each carrier-wave component will be independently amplitude modulated by separate signals which may be generally designated as $A_1$, $A_2$ and $A_3$ shown applied to the respective inputs of the carrier-wave units the outputs of which they amplitude modulate: $A_1$ for carrier #1, $A_2$ for carrier #2 and $A_3$ for carrier #3.

The outputs of the three carrier-wave units are applied to corresponding inputs of the output amplifier 26, where they are combined and amplified in appropriate networks so designed as to apply to the antenna 111 for transmission, all three carrier-waves and their respective signal components with minimum attenuation or distortion of the individual frequencies involved in the transmission.

It will be assumed that the composite carrier-wave, comprising the three modulated carrier-waves and their respective signal side-bands, is received by antenna 11, in FIG. 5. It should be noted that both the receiving antenna 11 and the transmitting antenna 111, are included under the heading of transmission means, for which may be substituted a single conducting element and a ground return, as in a wired transmission system, for example; or any other means for the conveyance of such signals.

Under the circumstances now being discussed, the three transmitted carrier-waves are received by antenna 11 and applied to the antenna input unit amplifier 12.

A portion of the signal output of unit 12 is applied to the input 70, of A.M. detector amplifier 21, already described in connection with FIG. 4, which is adjusted to produce at its output 90, an amplified fundamental wave representing the characteristics of amplitude modulation on the envelope of the received signal, as previously described.

Another portion of the signal-wave from unit 12 is applied to the input 91, of the discriminator amplifier 22, to produce at its output 92, a fundamental wave representing the wave of phase modulation of the received signal.

The output 90 of unit 21 is connected to the input 103 of the quadrature modulator 27. The output 92, of unit 22, is connected to input 104 of unit 27.

The quadrature modulator unit 27 is designed to mix in the resonant network associated with its output 105, two components of a local-wave applied at its inputs 106 and 107, which are separately modulated by converter tubes 108 and 109. As shown, the input 103, is connected to one input of converter tube 108, which has its other input connected to input 107. The input 104 is connected to one input of converter tube 109, which has its other input connected to input 106 of the quadrature modulator unit 27.

Two components of a local-wave, of equal frequency with the received carrier-waves, are applied from generator 28 to the two inputs 106 and 107, of the quadrature modulator 27.

The component of the local-wave output of the unit 28 which is applied to the input 106 has a 90 degree phase difference with the component which is applied to the input 107, and the actual phase positions involved may be any values. In this example, it may be assumed that the local-wave at the input 106 of the unit 27, is that of the primary wave generated by unit 28, which may be assumed to have a constant relative phase of 0 degree. The relative phase of the local-wave at the input 107 will be, in this example, 90 degrees.

The manner in which differently phased waves may be derived from a primary wave is well known in the art, and makes further discussion about the generator unneccessary, except to note that a third component of the local-wave from the unit 28 is applied to the input 36, of the wave mixer 13. In the present example, the constant relative phase of this local-wave component may be varied from 90 to 180 degrees, as desired, by suitable adjustment in the generator 28. Since the means for accomplishing this are also well known, it may suffice to state that, under the circumstances now being considered, the local-wave at the input 36 of the wave mixer has a constant relative phase of 90 degrees.

As before explained, the input 103, of unit 27, applies a fundamental wave representing the detected products of amplitude modulaton on the signal-wave to one input of converter tube 108, which receives at its other input, the local-wave component having a relative phase of 90 degrees.

The input 104 applies a fundamental wave representing the detected products of phase modulation of the signal-wave to one input of converter tube 109, which receives at its other input, the local-wave component having a relative phase of 0 degree.

The outputs of both converter tubes is mixed in the resonant networks associated with the plate circuit of both tubes, so as to apply to the output 105 a reconstructed signal-wave having all the functions of the total signal input to antenna 11, as it appears at the outputs of unit 12. For the purpose of the present disclosure, it will be assumed that the phase relations between the several waves, designated as $C_1$, $C_2$ and $C_3$, may be represented by the vector diagram shown in FIG. 2M. It is understood that suitable adjustments for the purpose are made in the associated networks and through the potentiometers in the converter tube circuits.

The wave mixer 13, which receives the reconstructed signal-wave from the output 105, of the quadrature modulator 27, at its input 32; and the component of the local-wave from the generator 28 at its input 36; is shown in detail as the identical wave mixer 13, of FIG. 1.

But the input 32, of the wave mixer in FIG. 5, receives the reconstructed signal-wave from the quadrature modulator 27, instead of the original signal from the output of the antenna input amplifier 12, as shown in connection with FIG. 1. Since it is intended that the reconstructed signal should be a substantially accurate reproduction of the functions derived from the original, signal, it may be assumed that the wave mirer of FIG. 5 will operate as described for the similar unit in connection with FIG. 1, though in the structure of FIG. 5 an additional carrier-wave is included in the signal complex received by antenna 11.

The composite signal-wave represented in FIG. 2M, appearing at the input 32, is mixed in the unit 13 with a component of the local-wave received at input 36, in the manner described in connection with FIG. 1, and applies to the input 38, of unit 15, the quadrature wave designated as $Q_1$, in FIG. 2N, and at input 40, the quadrature wave designated as $Q_2$. The local-wave and carrier-wave components $L_1$ and $C_1$, $C_2$ and $C_3$ are shown in their phase relations with respect to $Q_1$, and similarly for the components of $Q_2$.

The discriminator degenerator 15 has the same function in FIG. 5 as described for the similar unit in FIG. 1. It will be understood that since the quadrature phased local-wave components from which the signal-wave was reconstructed in the quadrature modulator 27, are derived from the same local-wave produced by the generator 28, the component $L_1$ will maintain its 90 degree phase difference with the desired carrier-wave which, in the present instance, is $C_1$. As indicated in connection with FIG. 2A, the sum of the two components $Q_1$–$Q_2$ and $Q_3$–$Q_4$, with the $L_1$ and $L_2$ values in exact quadrature phase relationship with their respective carrier waves, will be zero, regardless of the varying amplitudes of the carrier-wave components, providing that the respective carrier-wave $C_1$ components are equal, which is the present case.

Returning to FIG. 2N, the unwanted carrier components represented by $C_2$ and $C_3$, being out of quadrature phase with the respective local-wave components $L_1$ and $L_2$, will show amplitude differentiations between the values of $Q_1$ and those of $Q_2$, and these are representative of the phase differences and the signal amplitude variations of the respective carrier-waves.

In the manner described in connection with FIG. 1, the two quadrature components $Q_1$ and $Q_2$ are separately detected and compared in the discriminator degenerator 15, and the fundamental wave representative of the interference values of the carrier-waves $C_2$ and $C_3$ (but not of $C_1$, the amplitude of which has been cancelled in the sum of $Q_1$ and $Q_2$) appears at the output 48.

In connection with FIG. 1, this fundamental wave was applied to the input of the generator modulator 14 to vary the phase of its local-wave output sufficiently to cause it to maintain its phase quadrature relationship with the phase of the total signal. This resultant phase variation of the local-wave was then detected as a fundamental wave, and applied to the input of the audio inverter 17.

But in the present example, the reconstructed signal and the local-wave, being derived from the same primary wave generated in the unit 28, there is no necessity for maintaining phase control of the local-wave, except for initial adjustment of the phase of the local-wave with the phase of the particular carrier-wave it is desired to receive.

The fundamental wave at the output 48, of the unit 15, will therefore apply directly to the audio inverter 17, through its input 61. As shown in FIG. 1, the unit 17 has the simple function of producing two oppositely phased components, with incident amplification, of the single-ended fundamental wave at its input, and these two components are applied to the inputs 63 and 64 of the discriminator degenerator 15, where they amplitude modulate the quadrature components $Q_1$ and $Q_2$, through the respective inputs 38 and 40, of the converter tubes to which they are connected, as shown in FIGS. 1 and 5.

The amplitude modulation applied to each component $Q_1$ and $Q_2$ will be in a direction opposite to the amplitude variation caused by the interfering carrier-waves $C_2$ and $C_3$, thus constituting the application of negative feedback on the interfering components (but not on the carrier-wave $C_1$, since this has been cancelled in the sum of $Q_1$ and $Q_2$).

It will be noted that the constant potential developed by $Q_1$ and $Q_2$ as the result of detection (when the received carrier-waves are completely unmodulated) will vary from equality between the two components, by the small value represented by the constant amplitudes of the carrier-wave components in combination with the components $L_1$ and $L_2$. This may be compensated for, when necessary, by adjusting the relative amplitudes of the two local-wave components applied at their respective inputs to the quadrature modulator 27, to the relative values indicated by the dotted arrows referred to by the reference characters −L and +L, in FIG. 2N.

The wave output of the discriminator degenerator 15 applied to the input 65, of the signal discriminator 18, may be represented by the vector diagram of FIG. 2, at P.

The vector relations here shown are similar to those at C and J, previously referred to in connection with the reception of two carrier-waves, instead of three carrier-waves as in the present example.

Here again, the sidebands of inverse modulation on the respective components $Q_1$ and $Q_2$, are designated by the dotted lines S, for the superior sidecurrent and I for the inferior sidecurrent of amplitude modulation, each related by an arrow head in accordance with the direction of the modulation.

As indicated, the carrier-wave $C_1$ is present as phase variation of the quadrature component Q, but the carrier-wave components $C_2$ and $C_3$, together with their phase complementary components of inverse feedback, are substantially reduced. As previously noted, the negative feedback on the unwanted signals is applied as amplitude modulation of the wave Q, in which case the feedback factor is nearly, but not exactly, in phase opposition to the primary components it opposes, as would be the case, if the feedback were applied, instead, to the local-wave component L. But it is not thought necessary to burden the disclosure beyond pointing out what is already well known in the art.

The signal discriminator 18, already discussed in detail, needs no description except to state that the composite wave Q at its input 65, as represented by FIG. 2P, will be detected for its functions of phase modulation, thus producing at its output 66, a fundamental wave representative of the signal $A_1$, imposed as amplitude modulation on the carrier-wave #1, at the transmitting station, and designated by the reference character $C_1$. The interference value of the signals $A_2$ and $A_3$ will have been substantially reduced, as will other forms of stray interference, or other emissions occurring within the desired bandwidth of communication.

As before explained, the signals on the other transmitter carrier-waves as, for example, either $A_2$ or $A_3$, may be received while substantially rejecting the other unwanted signals, by adjusting the phase of the local-wave component applied to the wave mixer 13. For instance, by adjusting the phase of the local-wave from 90 degrees, as in the example cited in connection with FIG. 5, to 135 degrees, the carrier-wave designated as $C_2$ in FIG. 2M, will be received and the carrier-waves designated as $C_1$ and $C_3$ will be rejected. Similarly, by adjusting the phase of the local-wave to 180 degrees, the carrier-wave $C_3$ will be received and the carrier-waves $C_1$ and $C_2$ will be rejected.

This will be understood from the present disclosure by those trained in the art, as will also, the simple means by which the output of the generator 28 may be caused to change the phase of the local-wave from 90 degrees to 180 degrees, as indicated above.

While the means disclosed above embody the principles of the present invention, it will be understood that other equivalent means may be employed without departing from the spirit of the invention.

Figure 6:
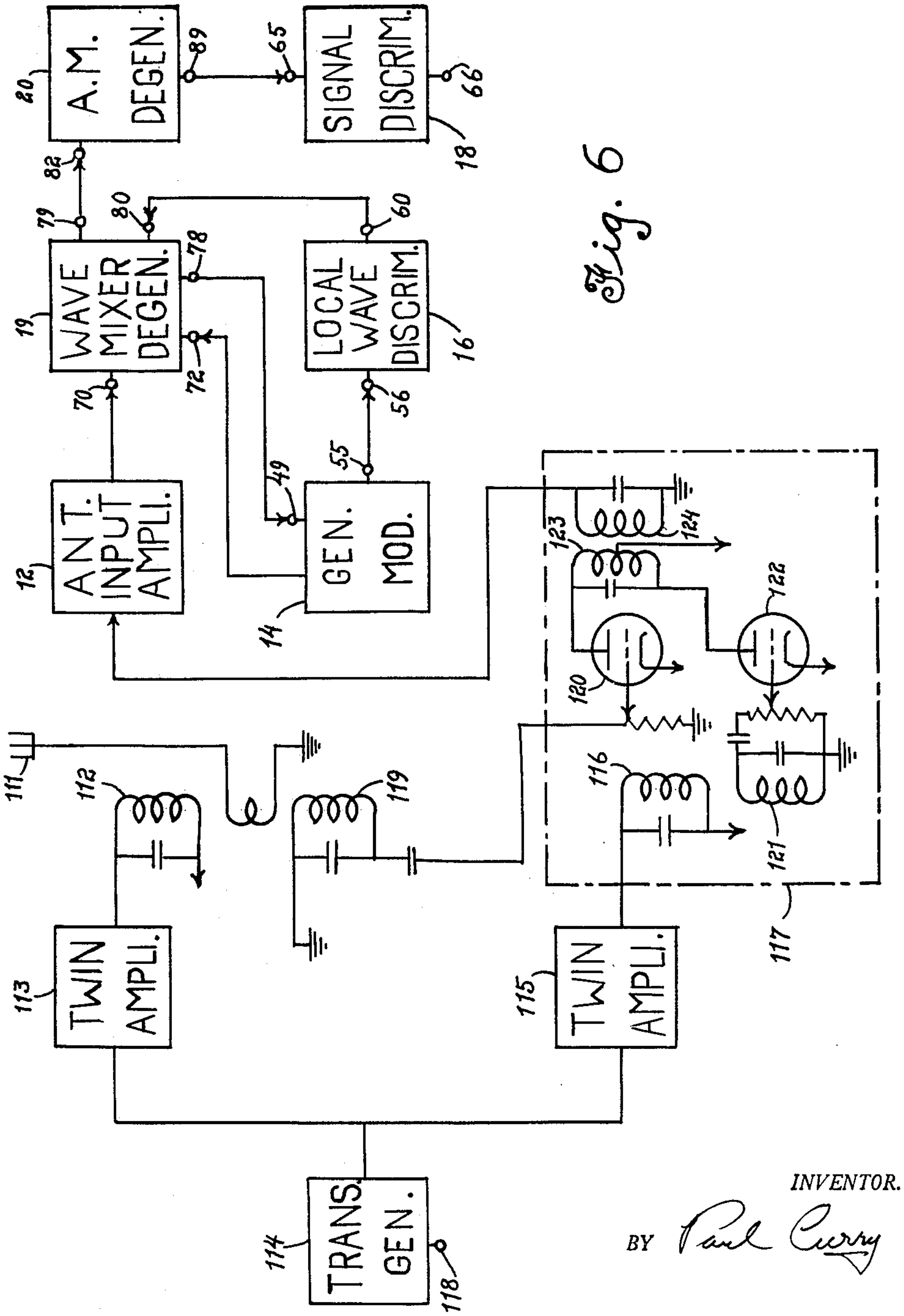
FIG. 6 is a combination diagram of a system for simultaneous transmission and reception within a single bandwidth.

*Simultaneous two-way single-bandwidth system of FIG. 6*

In another form of the invention the local-wave described in the previous examples, is expanded to the proportions of a carrier-wave for the transmission of intelligence, simultaneously with the detection of a signal which it is desired to receive; both the transmission of intelligence and the reception of a signal occurring within the same bandwidth allocation.

In such a system to be described with reference to FIGS. 2 and 6, it will be assumed that the antenna 111 transmits a carrier-wave transferred to it through the resonant network associated with the winding 112 at the output of twin amplifier 113. The carrier-wave at the output of unit 113 is part of the primary wave generated by the transmitter generator 114, and appearing at its output. Another equal part of the generator output is applied to the input of twin amplifier 115.

It will be assumed that the twin amplifiers 113 and 115 are so designed and adjusted, that the carrier-wave amplitude and the bandwidth characteristics of the networks associated with the inductive winding 112 are equal with those associated with the inductive winding 116, of the carrier neutralizer 117, to which the output of twin amplifier 115 is applied.

Under the present circumstances, the carrier-wave across windings 112 and 116 will be amplitude modulated by a signal applied to the input 118 of the transmitter generator 114, which, after amplification by the twin amplifiers 113 and 115, will produce equal sidebands of modulation across both windings. The signal sidebands will, of course, be transmitted by the antenna 111, together with the carrier-wave.

Simultaneously with the transmission of the carrier-wave with its complement of signal sidebands, it will be assumed that the antenna 111 is receiving a signal-modulated carrier-wave from a distant transmitting station and, in the present example, has a frequency close to that of the local carrier-wave output across inductive winding 112.

A portion of the local carrier-wave, together with a portion of the received carrier-wave is inductively transferred from the winding 112 and the antenna 111, to the inductive winding 119 and its associated resonant network. This is applied to the input of triode tube 120, of unit 117, through the associated potentiometer.

The carrier-wave component across winding 116, in unit 117, which is supplied by the twin amplifier 115, is inductively transferred to the inductive winding 121, and its associated resonant network. This is applied to the input of triode tube 122, of unit 117, through its associated potentiometer.

The plate output of tube 120 is applied to the resonant network associated with the primary winding 123 in opposition to the output of tube 122, through the center-tap of the winding.

By proper adjustment of the network values associated with the triode tubes, the component of the local carrier-wave applied to the input of triode tube 120, equals the component of the local-wave applied to the input of the triode tube 122; and the two components cancel in the primary winding 123.

But the received carrier-wave from the antenna 111 which is applied to the input of triode tube 120, is unopposed by any similar component at the input of tube 122, and this energy appearing across the winding 123, is inductively transferred to the secondary winding 124, and its associated resonant network.

The energy content of winding 124, comprises the carrier-wave and signal sidebands of the received signal, but with the local carrier-wave and its signal sidebands substantially cancelled by the opposing components of the local carrier-wave in primary winding 123; one of which is supplied by tube 120 from winding 119 in the antenna 111 network associated with the output of twin amplifier 113; and the other of which is supplied by the tube 122, from the winding 121 associated with the output of twin amplifier 115. This winding 124 applies the received signal to the input of the antenna input amplifier 12.

The amplified signal from the unit 12 is applied to the input 70, of the wave mixer degenerator 19. The unit 19, which is identical in its operation with the similar unit described in detail in connection with FIG. 3, receives a local-wave, of equal frequency with the carrier-wave received at its input 70. The local-wave is mixed with the received carrier-wave, in the unit 19.

As described in connection with FIG. 3, the sum of the local-wave and the received carrier-wave appearing at the output 78, of unit 19, and applied to input 49, of the generator modulator 14, causes phase modulation of the local-wave output of unit 14 to the degree necessary to maintain the phase of the local-wave in quadrature phase relationship with the phase of the signal carrier-wave.

Part of the local-wave energy at the output 55, of unit 14, is supplied to the input 56 of the local-wave discriminator 16 which, as before described, translates the wave of phase variation of the local-wave, into an amplified fundamental wave having the characteristics of any interference with the received carrier-wave which may be caused by stray frequencies within the bandwidth of reception of the antenna 111, or by other unwanted signal-modulated carrier-waves in frequency adjacency with the desired signal.

This fundamental wave, appearing at the output 60, of the unit 16, is applied to the input 80, of the wave mixer degenerator 19, where the amplified components of the interfering functions are applied in inverse phase to the interference functions so as to constitute the application of negative feedback on the phase excursions caused by the interference components. As a result, the phase variation of the local-wave is affected in a minimal degree by interference with the received carrier-wave, but the interference components appear as amplitude modulation on the resultant of the local-wave in combination with the received carrier-wave, which appears at the output 79, of the unit 19.

This may be seen by reference to FIG. 2, at I. Here is represented the case where, for example and as before discussed, an unwanted carrier-wave designated in the vector diagram as $C_2$, which has a frequency difference with respect to the desired carrier-wave designated as $C_1$, rotates its phase with respect to $C_1$ in accord with its frequency difference and, during a given time, produces a differential shown by the rotating arrow with the reference character $\Delta\theta$.

The wave represented by FIG. 2I is applied to the input 82, of the A.M. degenerator 20 where, as described in connection with FIG. 3, it is detected and the amplified functions of interference are applied as negative feedback on the original components of interference, thus to substantially reduce them.

As seen by the vector diagram shown in FIG. 2J, and discussed with reference to FIG. 3, an interfering wave designated as $C_2$, is substantially reduced in amplitude, and a component $C_3$, generated by the inverse amplitude modulation representing negative feedback, is also substantially reduced. But the amplitude of the desired carrier-wave is affected to a minor degree.

The wave, as represented in FIG. 2J, appears at the output 89, of the unit 20, and is applied to the input 65 of the signal discriminator 18. This unit has the simple, well-known function, as described, of translating the phase variations which are representative of the amplitude functions of the received carrier-wave into a fundamental wave characterizing the signal modulations of the received carrier-wave. This fundamental wave appears at the output 66, of the unit 18, substantially without interference from any components of stray frequencies or other signals occurring within the bandwidth of the resonant networks associated with the receiving system disclosed, or even from other carrier-waves of equal frequency, but phase displaced with respect to the desired carrier-wave.

It should be noted that in the case of two waves closely spaced in frequency, the direction of phase rotation of one wave with respect to the other is determined by the exact crest of the overall resonance curve of the receiving system. Since this is well-known in the art, it requires no explanation except to note the importance of proper adjustments in the component values of the various resonant networks described. Such adjustments are readily feasible in the present advanced state of the art.

It should also be noted that though the local carrier-wave, with its complement of signal sidebands, is cancelled in the carrier neutralizer unit 117, some remainder of the energy involved which appears with the received carrier-wave may be substantially reduced with the other interference components, as described.

It may be assumed that another such system as described in connection with FIG. 6, is simultaneously transmitting from a distant point, the signal-modulated carrier-wave which is received by the antenna 111, and is simultaneously receiving the signal-modulated carrier-wave transmitted by the same antenna 111.

It is also possible to employ a communication network with numbers of such systems as described in FIG. 6, cooperating to derive the unique advantages of the invention, already referred to.

Other applications of the invention will become apparent to those skilled in the art, from the present disclosure such as, for example, the promotion of secrecy in communication. One method of carrying out this form of the invention is that of simultaneously transmitting a number of carrier-waves having the same frequency but phase displaced with respect to each other, modulating each carrier by an independent signal to be transmitted, and simultaneously varying the frequency of each carrier-wave, according to a predetermined rate, and at a receiving station, varying the frequency of a local-wave at the same predetermined rate, heterodyning the local-wave with the received carrier-waves, and applying the resultant wave representing the number of transmitted carrier-waves to a receiver, as described herein, to detect one carrier-wave and its complement of sidebands, while reducing or eliminating the other carriers and their respective sidebands.

The form of the invention described may provide a method of continuous ranging to convey information about the distance separating any two points in space. In order to carry out this application of the invention, two transmitter-receiver units as described in FIG. 6, are caused to co-operate between any two points in space. A continuous fundamental wave having a frequency, for example, of 20 kilocycles per second, is modulated on the carrier-wave of the first unit and transmitted. The second unit receives the first carrier-wave, detects the 20 kilocycle signal, and re-transmits it. The first unit receives the 20 kilocycle signal transmitted by the second unit, detects the signal and compares it with a component of the 20 kilocycle wave originally transmitted by the first unit. The difference in phase between the signal-wave transmitted by the first unit and the signal received from the second unit conveys information about the total distance traveled by the signal-wave.

*Reception of signal without a local-wave*

The invention as heretofore disclosed employs several modes of combining a local-wave with a received signal to carry out the features described. It should be pointed out that while the use of a local-wave in the examples described is highly illustrative of the means by which the unique features may be carried out, it is not essential to the operation of the invention.

For example, in the form described in connection with FIG. 4, it was shown that the functions of amplitude modulation and the functions of phase modulation of a particular received signal may be separately detected, and the products of detection are separately applied to modulate a local-wave. The detected products of amplitude modulation are applied as phase modulation, and the detected products of phase modulation of the signal-wave are applied as amplitude modulation. The various functions of the doubly-modulated local-wave may then be represented by the vector relations shown by FIG. 2I, assuming as before described, that the signal-wave comprises two carrier-waves designated as $C_1$ and $C_2$, closely spaced in frequency, as shown in FIG. 2K.

It may be assumed that a second component of the local-wave, of opposite phase to the first component described above, is also doubly-modulated by the fundamental functions of the signal-wave, but the detected products of phase variation of the signal-wave are applied as amplitude modulation on the second local-wave, but in opposite phase to the amplitude modulation of the first local-wave.

The various functions of the second doubly-modulated local-wave will differ from those represented by FIG. 2I in that the rotation of the carrier-wave $C_2$ with respect to the carrier-wave $C_1$ will be opposite to that shown in FIG. 2I indicated by the rotating arrow labeled "$\Delta\theta$," this representing the two carrier-waves in a relationship shown by FIG. 2L.

By combining the two doubly-modulated local-waves in phase opposition, assuming them to be equal in amplitude, and equally modulated by the signal derived functions, the local-wave components will cancel. It will be seen by comparing FIGS. 2K and 2L, that if the signal functions are thus brought into opposition, the vectors representing the carrier-wave $C_1$ will also cancel, but the vectors representing the carrier-wave $C_2$ will not. This again demonstrates the cancellation of selected signals, while the functions of interfering signals remain to be amplified and applied as components of inverse feedback on the interfering signals, as previously discussed.

It will be understood that the application of negative feedback by appropriate amplitude modulation of the local-wave in opposition to the interfering signals may be accomplished before the cancellation of the local-wave and selected signal as above described. The resultant signal, after cancellation of the selected signal, and the application of inverse feedback, will appear free from any component of the local-wave or from interference by the unwanted carrier-wave, and may be detected as the desired signal by direct demodulation of its amplitude functions, and not as phase variation of the local-wave, previously described.

Other methods of carrying out the features of the invention without the use of the local-wave may be readily understood by those trained in the art.

As an example the signal-wave is centered between two oscillation waves, each having an equal frequency difference with the frequency of the desired carrier-wave $C_1$. The two oscillation waves are separately heterodyned with the signal-wave, and the two resulting heterodyne waves will each have the modulation functions of the signal. Both heterodyne waves and their respective signal modulations are adjusted for equal amplitude values. By appropriate adjustment of the constant relative phase of each heterodyne wave, the respective signal components will be represented by the vector relations of FIGS. 2K and 2L.

By opposing the functions of both heterodyne waves, the components of the carrier-wave $C_1$ will cancel, but the components of the carrier-wave $C_2$, not being in exact opposition, will appear as components of interference which, when amplified and applied to a component of one of the heterodyne waves in the appropriate direction to represent negative feedback, will reduce the amplitudes of the components of interference.

The carrier-wave designated as $C_1$ may then be detected for its functions of amplitude modulation representative of the desired signal, substantially free from interference by the functions representative of the interfering carrier-wave $C_2$.

*Carrier suppression and frequency modulation with system of FIG. 5*

The several forms of the invention hereinbefore disclosed in connection with FIGS. 1 to 6, assumed the use of amplitude-modulation in the modulation of the carrier-waves described.

While this form of modulation is preferred in the descriptions, it is not intended to thus limit the invention. It can be shown that the receiving structure of FIG. 5, for example, may be adapted for the reception of carrier-waves upon which signals are imposed by means of phase modulation, where the degree of modulation involves relatively low values of phase deviation. This is also the case for frequency-modulation where the deviation ratio is low. Where the phase shift $\Delta\theta$ is less than 22.92 degrees for phase-modulation and the frequency deviation $\Delta F/f$ is less than .4 for frequency modulation, only one significant pair of sidecurrents appear for each modulation frequency.

Inasmuch as the sidecurrents of phase modulation and frequency modulation occur in quadrature to the sidecurrents of amplitude modulation for low deviation ratios, this is the only difference between the two forms of modulation. Since only one pair of significant sidecurrents need be considered for low deviation frequency modulation as is the case for amplitude modulation, the bandwidth requirements are the same for both forms.

While the carrier waves discussed in connection with the vector representations of FIG. 2 were amplitude modulated as transmitted, their quadrature phase relationships with the local-waves of the several forms of receiving structures described, in effect translate the signal amplitude modulation of at least the desired carrier-wave into phase modulation. This is not phase modulation in the orthodox sense, since the effect is that of adding a quadrature component of the center-frequency to the phase modulated wave, thus eliminating the quality of polarity from the overall phase shift, i.e., the phase swings are to one side only of the constant relative phase representing the carrier-wave.

Since amplitude modulation is a modulation in quadrature with the time axis of the carrier-wave, and phase modulation is a modulation along the time axis, it may be seen by reference to FIG. 2M, that the products of amplitude modulation on the carrier-waves represented by the vectors $C_1$, $C_2$ and $C_3$ are in the same direction as would be the case if the vectors were merely the products of phase modulation whose respective carrier- or center-frequencies were in quadrature with them.

If the carrier vectors of FIG. 2M, for example, are assumed to be representative only of the signal product imposed upon the several carrier-waves as transmitted by antenna 111, as would be the case in carrier-suppression systems, the previous discussion in connection with the structure of FIG. 5 will apply with equal force. For as is well-known, the important factor in the transmission and reception of intelligence is not the carrier-wave, but the product associated with the carrier-wave which conveys the intelligence.

This product, comprising a pair of sidebands alone in a carrier-suppressed system; or in combination with a carrier-wave in a carrier-transmitted system utilizing amplitude modulation; or in quadrature combination with a carrier- or center-frequency in a system utilizing low-deviation phase or frequency modulation; is the vector sum which it is important to maintain in quadrature phase relationship with the local-wave components represented by the vectors $L_1$ and $L_2$ in FIG. 2N.

The method already described in connection with FIG. 5, makes possible the transmission and reception of three carrier-waves upon which the signals are imposed by amplitude modulation.

It would require little or no adjustments in the receiving system associated with the antenna 11, if all three carrier-waves transmitted by antenna 111 were suppressed, leaving only the sidebands of the respective carrier-waves to be transmitted. The vectors $C_1$, $C_2$ and $C_3$ in FIGS. 2M and 2N would then indicate only the sideband products of the multiplex transmission, but not the respective carrier-waves.

The adjustments in the units 23, 24 and 25 associated with the transmitting antenna 111, to suppress the several carrier-waves, would be accomplished in a manner so well-known in the art that it requires no elaboration.

The system described in connection with FIG. 5 may likewise transmit and receive signals having low-deviation phase- or frequency-modulation with equally minor adjustments of the system to accomplish the purpose. It may be understood that the receiving system associated with antenna 11 requires little or no adjustment for the purpose, for the vectors $C_1$, $C_2$ and $C_3$ again represent the phase relations of the sideband products imposed by frequency modulation. In this case, the quadrature currents of the carrier phase associated with the product $C_1$ would be synchronous with one of the local-wave components represented in FIG. 2N, assuming this to be the signal it is desired to receive. The other two unwanted carrier phases associated with the signal products $C_2$ and $C_3$ would constitute deviations from the constant relative phase of the local wave components. These would be compensated for by a minor adjustment of the phase of the local-wave in the appropriate direction. Such adjustments are referred to in the previous description in connection with FIG. 5.

For the transmission of signals by means of low-deviation phase- or frequency-modulation, the means described as units 23, 24 and 25, associated with the transmitting antenna 111, may be assumed to include appropriate structures well-known in the art, designed to advance the constant relative phase of each carrier-wave to a quadrature relationship with respect to the phase positions shown. For example, in the case shown, the carrier-wave #1 could have a constant phase of 90 degrees or 270 degrees; the carrier #2, 135 degrees or 315 degrees; and the carrier #3, 180 degrees or $\phi$ degrees. The signals $A_1$, $A_2$ and $A_3$ applied to the respective carrier-waves as phase-modulation, for example, would then be reconstructed in the unit 27, of FIG. 5, and applied to the input 32, of wave mixer 13, in the manner previously described, to be the signal products represented as $C_1$, $C_2$ and $C_3$ in FIG. 2Q.

As shown, the reference characters $C_1$, $C_2$ and $C_3$ each indicates a vertex from which are pointing opposing arrows indicating the alternate directions of phase swing of the signal products, and to which it may be envisioned that another vector, in quadrature relation will point, to represent the respective carrier-waves.

It has been shown that the system of FIG. 5 may be used to convey intelligence by means of multiplex transmission and reception in which the modulation is either in the form of amplitude modulation, with the carrier-waves included in the transmission, or from which the carrier-waves are suppressed; or in which the modulation is in the form of phase- or frequency-modulation employing low-deviation ratios.

In general, however, the system more completely described which employs amplitude modulation, is preferred to carry out the method of the invention since, as has been shown, the quadrature functions involved in frequency modulation are clearly shown, in the above discussions, to be related to and can be derived from, the simple functions of amplitude modulation, and with less structural complexity.

While specific examples of circuits to carry out the methods have been described, it is understood that other equivalent circuits may also be employed.

What I claim is:

1. A method of simultaneously transmitting a carrier-wave and receiving a plurality of carrier-waves, all of said carrier-waves being amplitude modulated by independent signals, one for each carrier-wave, and having the sum of their frequency differences less than the frequency bandwidth of any thus modulated carrier-wave; receiving all of said carrier-waves as a common input signal in combination with a first local-wave equivalent to the transmitted signal modulated carrier-wave, thereby to substantially cancel said transmitted carrier-wave from the input signal; co-operatively relating said input signal comprising the said plurality of received carrier-waves with a second local-wave having a predetermined phase relationship with a selected one of said carrier-waves, whereby the selected carrier-wave will cancel; detecting the uncancelled carrier-waves not co-operatively related to the predetermined phase of the second local-wave, and generating components of negative feedback to reduce the said uncancelled carrier-waves by amplitude modulating the second local-wave inversely to the detected components of the uncancelled carrier-waves; and detecting the signal modulation of the selected carrier-wave from the second local-wave, substantially without interference from the other carrier-waves.

2. A circuit to eliminate unwanted interference in radio receivers comprising: a mixing circuit to combine an input signal with a local-wave having a predetermined phase relationship with a selected signal; a local-wave generator circuit to supply said local-wave connected to the mixing circuit, and controlling means connected between the mixing circuit and the local-wave generator to maintain said predetermined phase relationship between the selected signal and the local-wave, thereby to cancel the selected signal; translating means connected to the local-wave generator to translate phase variations of the local-wave into fundamental functions representative of the uncancelled signals not in said predetermined phase relationship with the local-wave; modulating circuit means connected between the translating means and the mixing circuit to effect negative feedback to reduce said uncancelled signals; and a discriminator circuit connected to said mixing circuit to detect the selected signal, substantially free from interference by the unwanted signals.

3. A circuit to eliminate unwanted interference in radio receivers comprising: a detection circuit to detect the fundamental wave of amplitude modulation in an input signal circuit; a translating circuit to translate the phase variations of the input signal circuit into a fundamental function of phase variation; a local-wave generator to supply a first local-wave in phase quadrature with a second local-wave, also supplied by the local-wave generator; modulating circuit means connected to the detection circuit and the local-wave generator to modulate the first local-wave by the said fundamental wave of amplitude modulation; modulating circuit means connected to the translating circuit and to the local-wave generator to modulate the second local-wave by the said fundamental function of phase variation; a mixing circuit combining the first local-wave and the second local-wave in a reconstructed input signal, connected to the modulating circuit means; combining a third local-wave with the reconstructed input signal by connection between the mixing circuit and the local-wave generator, said third local-wave being adjusted to have a predetermined phase relationship with a selected signal of the reconstructeed input signal. thereby to cancel said selected signal; a detection means connected to said mixing circuit to detect the uncancelled signals in the reconstructed input signal; modulating circuit means connected to the detection means and to the mixing circuit effecting negative feedback to reduce the uncancelled signals; and a discriminator circuit connected to the modulating circuit means to translate the selected signal from the phase variations of the local-wave, substantially without interference from the unwanted interference.

4. In a radio receiver having means to reduce interference and eliminate frequency components of radio waves in a receiver input which are asymmetrical with respect to a predetermined frequency: means converting signal components deviating in frequency from a predetermined frequency into components of amplitude modulation so that signals symmetrical with respect to said predetermined frequency will cancel, leaving components of amplitude modulation representative of asymmetrical interfering signals; means including local-wave generator for providing a local-wave, modulation means connected to said converting means to modulate said local-wave by said components of amplitude modulation representative of asymmetrical signals; means applying said modulated local-wave to the receiver input as components of negative feedback, thus to reduce the amplitude of the input signals asymmetrical with respect to said predetermined frequency, whereby said asymmetrical signals appear as phase modulations of the local-wave; and means connected to said receiver input for detecting the said phase modulations substantially representative of said symmetrical signals.

References Cited by the Examiner

UNITED STATES PATENTS

| | | | |
|---|---|---|---|
| 2,053,014 | 9/36 | Walton. | |
| 2,183,714 | 12/39 | Franke et al. | 325—475 |
| 2,422,083 | 6/47 | Crosby | 329—132 |
| 2,494,323 | 1/50 | Weber | 325—481 |

OTHER REFERENCES

Belles: "Reduction of Heterodyne Interference," Electronics, December 1945, pp. 150, 151.

DAVID G. REDINBAUGH, *Primary Examiner.*

GEORGE N. WESTBY, *Examiner.*